(12) United States Patent
Stevens et al.

(10) Patent No.: US 8,264,516 B2
(45) Date of Patent: *Sep. 11, 2012

(54) METHOD AND APPARATUS FOR PROCESS MAGNIFICATION ADJUSTMENT

(75) Inventors: James W. Stevens, Rochester, NY (US); David Mark Kerxhalli, Rochester, NY (US); Siddharth Rajiv Inamdar, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/645,603

(22) Filed: Dec. 23, 2009

(65) Prior Publication Data

US 2011/0149302 A1    Jun. 23, 2011

(51) Int. Cl.
B41J 2/435    (2006.01)
(52) U.S. Cl. ......... 347/249; 347/234; 347/235; 347/248
(58) Field of Classification Search .................. 347/237, 347/247, 249, 234, 235, 248
See application file for complete search history.

(56) References Cited

U.S. PATENT DOCUMENTS

| | | | |
|---|---|---|---|
| 4,278,344 A | 7/1981 | Sahay | |
| 5,555,084 A | 9/1996 | Vetromile et al. | |
| 5,970,295 A | 10/1999 | Samizo | |
| 6,389,260 B1 | 5/2002 | Kataoka et al. | |
| 6,419,222 B1 | 7/2002 | Morrison et al. | |
| 6,456,310 B1 | 9/2002 | Wallace et al. | |
| 6,529,643 B1 | 3/2003 | Loce et al. | |
| 6,700,600 B1 * | 3/2004 | Sandstrom et al. | 347/256 |
| 6,814,004 B2 | 11/2004 | Lofthus et al. | |
| 6,816,269 B1 | 11/2004 | Loce et al. | |
| 6,920,307 B2 | 7/2005 | Howe | |
| 7,039,348 B2 | 5/2006 | Kerxhalli et al. | |
| 7,158,751 B2 | 1/2007 | Howe | |
| 7,272,334 B2 | 9/2007 | Moore et al. | |
| 7,277,669 B2 | 10/2007 | Howe | |
| 8,031,219 B2 * | 10/2011 | Kondo | 347/249 |
| 2004/0252355 A1 * | 12/2004 | Chen | 358/497 |
| 2006/0092264 A1 | 5/2006 | Matsuzaki et al. | |
| 2006/0099019 A1 | 5/2006 | Howe | |
| 2006/0232661 A1 * | 10/2006 | Niland et al. | 347/249 |
| 2007/0047048 A1 | 3/2007 | Shimizu | |
| 2007/0139715 A1 | 6/2007 | Kazama et al. | |
| 2008/0278735 A1 | 11/2008 | Wang et al. | |

(Continued)

OTHER PUBLICATIONS

U.S. Appl. No. 12/194,958, filed Aug. 20, 2008, Kulkarni et al.

(Continued)

Primary Examiner — Stephen Meier
Assistant Examiner — Sarah Al Hashimi
(74) Attorney, Agent, or Firm — Fay Sharpe LLP (57) ABSTRACT

A magnification adjustment method for a document processing system having a fixed frequency clock source providing a fixed frequency output signal to a plurality of raster output scanners (ROSs) and a numerically controlled oscillator (NCO)-based adjustable frequency clock source providing an adjustable frequency output signal to the ROSs is disclosed. The method includes: using a controller to determine a frequency setting for a phase increment control input signal to the adjustable frequency clock source; starting the document processing system; using the controller to set a phase accumulator control input to the frequency setting; sending a message to a ROS control module prior to imaging, including the correct clock source to use for the next image, the correct clock source being either the fixed frequency clock source or the adjustable frequency clock source; and applying the correct clock source synchronously to the beginning of an inter image panel zone.

23 Claims, 6 Drawing Sheets

U.S. PATENT DOCUMENTS

| | | |
|---|---|---|
| 2010/0020364 A1 | 1/2010 | Kerxhalli et al. |
| 2010/0046033 A1 | 2/2010 | Kulkarni et al. |
| 2010/0309526 A1 | 12/2010 | Kulkarni et al. |
| 2011/0149302 A1 | 6/2011 | Stevens et al. |

OTHER PUBLICATIONS

Office Action dated Aug. 20, 2011, U.S. Appl. No. 12/177,376, filed Jul. 22, 2008.h

* cited by examiner

FIG. 7

METHOD AND APPARATUS FOR PROCESS MAGNIFICATION ADJUSTMENT

BACKGROUND

The present exemplary embodiment relates to document processing systems such as printers, copiers, multi-function devices, etc., and more particularly to mitigation of side 1 to side 2 process magnification errors (sometimes referred to as "show-thru" or "see-thru" error) in printing engines and duplex printing methods for printing images on two sides of a printed substrate. This form of magnification error is seen as a difference in the image size for images printed on two different sides of a printed substrate, and is unacceptable in many customer applications. Show-thru errors are mainly caused by the substrate shrinking when fed through a fusing station after the image is transferred to the first side of the substrate and before an image is transferred to the second side. In particular, conventional duplex printing systems include a duplex routing station and media inverter downstream of the fusing station that re-introduce a printed sheet into the transfer path before the once-printed sheet has had time to be re-acclimated to the ambient temperature. The side 2 image is then transferred to the shrunken paper and becomes larger relative to the side 1 image once the paper resumes the original size. This results in a process magnification error evident as a show-thru discrepancy between the image sizes on either side of the substrate, with the side 2 image appearing larger than the side 1 image in the process direction.

The error can be addressed somewhat by shifting the margin for the side 2 image in order to evenly distribute the magnification error equally on both sides. However, this approach does not reduce the process magnification error, but instead makes it less apparent upon visual inspection. Image data may be manipulated to artificially shrink the side 2 image, for instance, by removing certain data, but this leads to image defects.

A technique to implement a side 1 to side 2 image to paper registration system in a digital printer is described in U.S. application Ser. No. 12/177,376, filed Jul. 22, 2008. That approach applies a different image magnification to side 2 that is used to compensate for paper shrinkage due to moisture lost from a fuser and other sources by implementing a method to change raster output scanner (ROS) motor polygon assembly (MPA) speed when imaging side 2 of a sheet compared to side 1. However, to implement the side 1 to side 2 registration system described above an apparatus to adjust ROS MPA rotational velocity in 0.01% increments is necessary.

Consequently, a need remains for improved printing systems and duplex printing techniques by which the adverse effects of side 1 to side 2 process magnification errors can be mitigated.

BRIEF DESCRIPTION

The exemplary embodiments described herein detail a solution to satisfy the needs described earlier by implementing a method of controlling the ROS MPA control frequency using a numerically controlled oscillator (NCO), which is controlled by a controller and associated software, to generate a clock frequency. The NCO output is used to source a square wave digital clock signal that is, in turn, used as an input to a ROS Motor Polygon Assembly (MPA) velocity control circuit. The ROS MPA control circuit regulates its speed by phase locking to this NCO generated ROS Master Clock (RMC) signal.

In one embodiment, a document processing system is provided. The system includes: a photoreceptor that continuously moves along a closed path; a plurality of raster output scanners (ROSs) located along the closed path of the photoreceptor, the ROSs individually operable to generate a latent image on a portion of the photoreceptor based on a clock input; a fixed frequency clock source providing a fixed frequency output signal to the ROSs; a numerically controlled oscillator-based adjustable frequency clock source providing an adjustable frequency output signal to the ROSs; a plurality of developers individually located downstream of a corresponding one of the ROSs and individually operable to develop toner of a given color on the latent image on the photoreceptor; a transfer station operative to transfer the developed toner to a substrate traveling along a first substrate path; a fusing station for fixing the transferred toner to the substrate; a duplex router receiving the substrate from the fusing station and operative to selectively direct the substrate along a second path; and a media inverter located along the second path and operative to invert the substrate and to return the inverted substrate to the first path upstream of the transfer station. In addition, a controller is coupled with the ROSs to selectively operate a given ROS according to the fixed frequency output signal if the latent image being generated by the given ROS is to be fixed to a first side of the substrate or according to the adjustable frequency output signal if the latent image being generated by the given ROS is to be fixed to a second side of the substrate.

In another embodiment, a raster output scanner (ROS) for generating a latent image on a portion of a photoreceptor traveling along a closed path past the ROS is provided. The ROS includes: a light source operative to generate light according to image data; a scanning mechanism that directs light from the light source toward a photoreceptor according to a selected clock input; a fixed frequency ROS master clock input signal; an adjustable frequency ROS master clock input signal; and a clock select component that selectively connects one of the input signals to the selected clock input according to a select input.

In yet another embodiment, a duplex printing method is provided. The method includes receiving image data for print job pages and selectively generating latent images on panel zone portions of a photoreceptor that continuously moves along a closed path using a plurality of raster output scanners (ROSs) positioned along the path. The latent image is generated by a given one of the ROSs by selectively operating the given ROS according to a fixed frequency ROS master clock signal if the latent image being generated by the given ROS is to be fixed to a first side of a substrate or according to an adjustable frequency ROS master clock signal if the latent image being generated by the given ROS is to be fixed to a second side of the substrate. The method further includes: developing toner of a given color on the latent images on the photoreceptor using a plurality of developers individually located downstream of a corresponding one of the ROSs; transferring the developed toner to a substrate traveling along a first substrate path using a transfer station; fixing the transferred toner to the substrate using a fusing station; for two-sided printing, selectively directing the substrate along a second path using a duplex router; and for two-sided printing, selectively inverting the substrate using a media inverter located along the second path and returning the inverted substrate to the first path upstream of the transfer station.

In yet another embodiment, a magnification adjustment method for a document processing system having a fixed frequency clock source providing a fixed frequency output signal to a plurality of raster output scanners (ROSs) and a numerically controlled oscillator (NCO)-based adjustable frequency clock source providing an adjustable frequency output signal to the ROSs is provided. The method includes: (a) using a controller to determine a frequency setting for a phase increment control input signal to the NCO-based adjustable frequency clock source; (b) starting the document processing system; (c) using the controller to set a phase accumulator control input to the frequency setting determined in step (a) above; (d) sending a message to a ROS control module (RIM) in the document processing system prior to imaging, wherein the message the correct clock source to use for the next image, the correct clock source being either the fixed frequency clock source or the NCO-based adjustable frequency clock source; and (e) applying the correct clock source synchronously to the beginning of an inter image panel zone.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to correction of process magnification errors in document processing systems and is hereinafter illustrated in the context of an exemplary multi-color document processing system having five raster output scanners and corresponding developers situated around a photoreceptor belt traveling at a generally constant speed along a circuitous closed path, although the various aspects of the disclosure can be implemented in association with systems employing any number of ROSs and using any form of intermediate transfer medium, including without limitation photoreceptor belts, drums, and the like. Moreover, the concepts of the present disclosure find utility in association with printing systems that include multiple transfer stages prior to printing on a final print media, wherein implementations of the disclosed concepts in any such alternate systems are contemplated as falling within the scope of the present disclosure and the appended claims.

Figure 1:
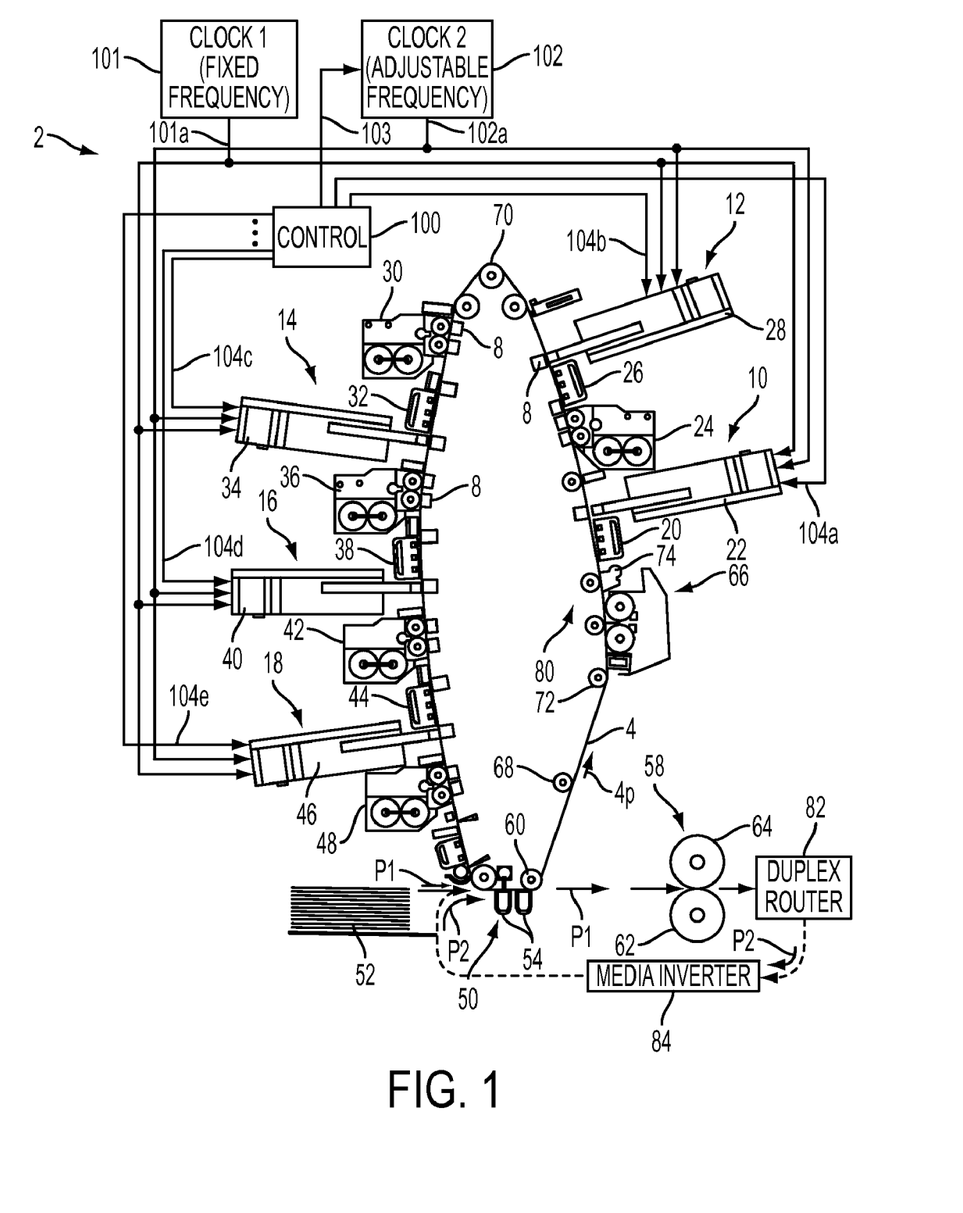
FIG. 1 is a simplified schematic diagram illustrating an exemplary multi-color document processing system with a plurality of selectively adjustable ROSs in accordance with one or more aspects of the present disclosure.
Figure 2:
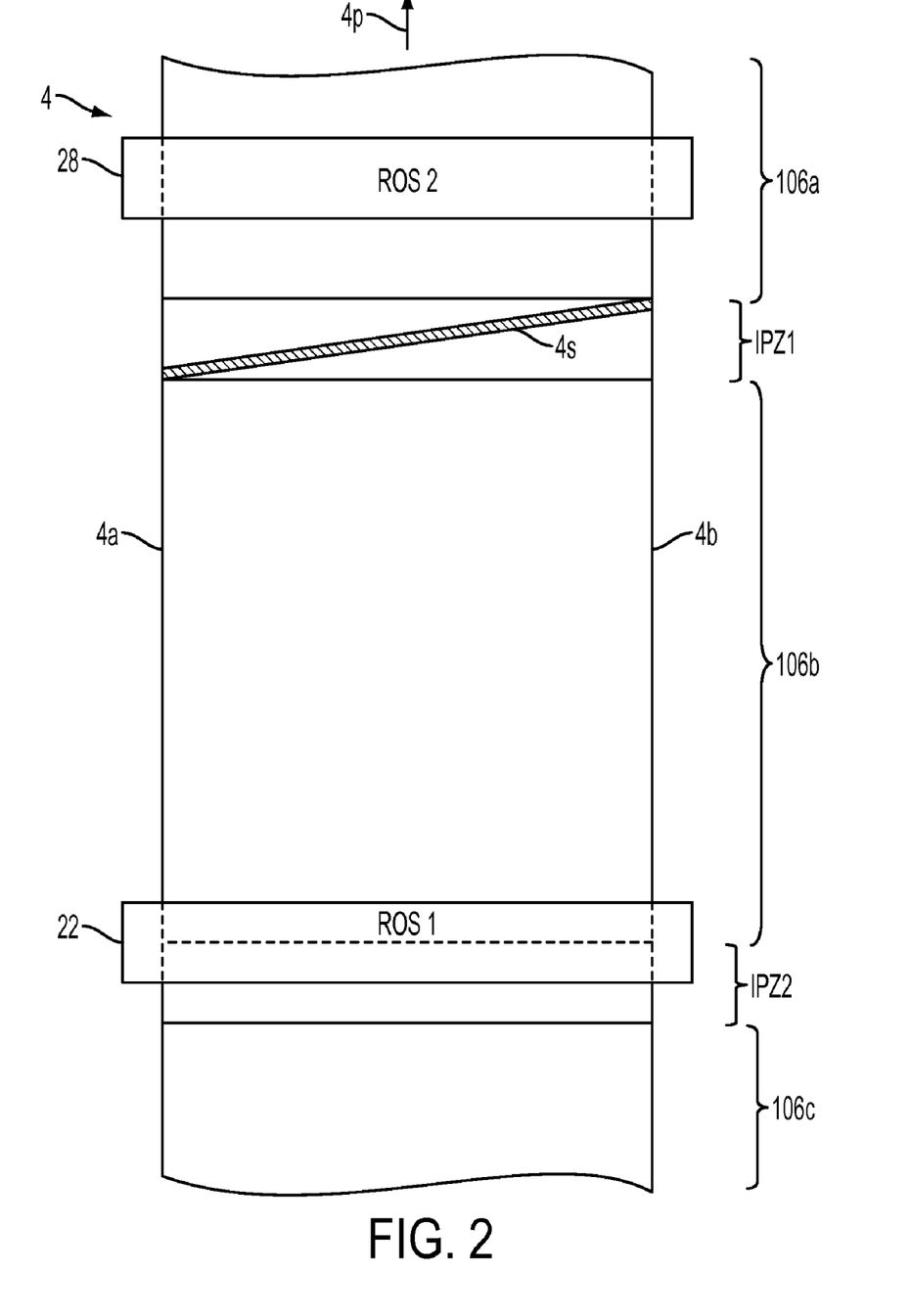
FIG. 2 is a partial top plan view illustrating a portion of the exemplary photoreceptor belt in the system of FIG. 1 with image panel zones separated by inter panel zones.
Figure 3:
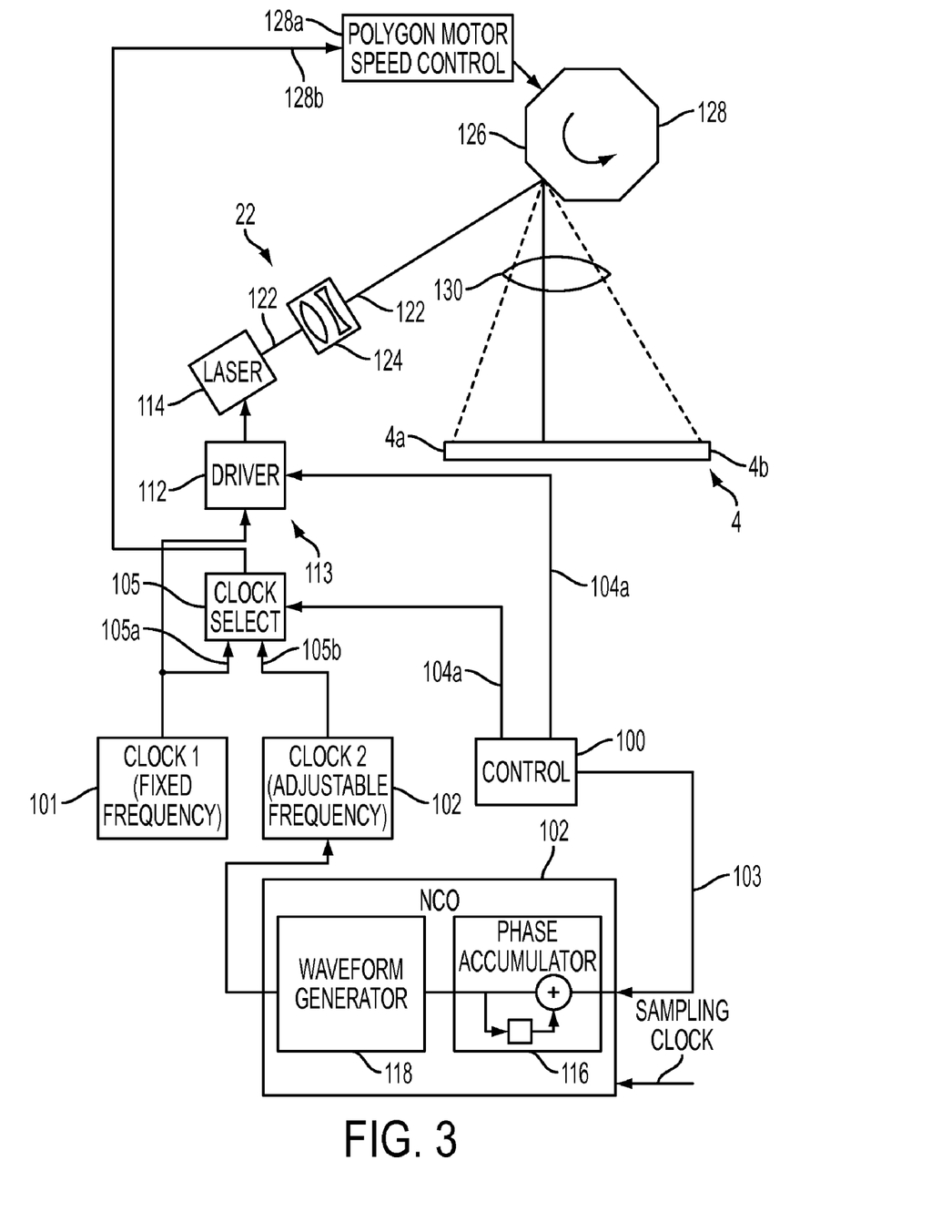
FIG. 3 is a simplified schematic diagram illustrating an exemplary multi-speed ROS in accordance with various aspects of the disclosure.

FIG. 1 illustrates an exemplary multi-color xerographic document processing system (or print engine) 2 including a continuous photoconductive (e.g., photoreceptor) imaging belt 4 having first and second lateral sides 4a and 4b (See FIG. 2). The photoreceptor belt 4 traverses a closed path 4p (counterclockwise in the view of FIG. 1) of a drive assembly 80 having a series of rollers 68 and 70 or bars 8 at a substantially constant speed to move successive portions of its external surface sequentially beneath the various xerographic processing stations disposed about the path 4p in the system 2. Beginning on the right side in FIG. 1, the belt 4 passes through a first charging station 10 that includes a charging device such as a corona generator 20 that charges the exterior surface of the belt 4 to a relatively high, and substantially uniform potential. The charged portion of the belt 4 advances to a first raster output scanner (ROS) type exposure device 22, which imagewise illuminates the charged belt surface to generate a first electrostatic latent image thereon, where FIG. 3 schematically illustrates further details of the exemplary first ROS device 22. The first electrostatic latent image is developed at a development station by developer unit 24 that deposits charged toner particles of a selected first color on the first electrostatic latent image.

Once the toner image has been developed, the photoreceptor belt 4 advances to a recharging station 12 that recharges the belt surface, and a second ROS 28 image-wise illuminates the charged portion of the belt 4 selectively to generate a second electrostatic latent image corresponding to the regions to be developed with toner particles of a second color. The second latent image then advances to a subsequent developer unit 30 that deposits the second color toner on the latent image to form a colored toner powder image of that color on the belt 4. The belt 4 then continues along the path 4p to a third image generating station 14 that includes a charging device 32 to recharge the belt 4 and a ROS exposure device 34 which illuminates the charged portion to generate a third latent image. The belt 4 proceeds to the corresponding third developer unit 36 which deposits toner particles of a corresponding third color on the belt 4 to develop a toner powder image, after which the belt 4 continues on to a fourth image station 16. The fourth station 16 includes a charging device 38 and a ROS exposure device 40 at which the belt 4 is again recharged and a fourth latent image is generated, respectively, and the belt 4 advances to the corresponding fourth developer unit 42 which deposits toner of a fourth color on the fourth latent image. The belt 4 then proceeds to a fifth station 18 that includes a charging device 44 and a ROS 46, followed by a fifth developer 48 for recharging, generation of a fifth latent image, and development thereof with toner of a fifth color.

Thereafter, the photoconductive belt 4 advances the multi-color toner powder image to a transfer station 50 at which a printable medium or substrate, such as paper 52 in one example is advanced from a stack or other supply via suitable sheet feeders (not shown) and is guided along a first substrate media path P1. A corona device 54 sprays ions onto the back side of the substrate 52 that attracts the developed multi-color toner image away from the belt 4 and toward the top side of the substrate 52, with a stripping axis roller 60 contacting the interior belt surface and providing a sharp bend such that the beam strength of the advancing substrate 52 strips from the belt 4. A vacuum transport or other suitable transport mechanism (not shown) then moves the substrate 52 along the first media path P1 toward a fusing station 58. The fusing station 58 includes a heated fuser roller 64 and a back-up roller 62 that is resiliently urged into engagement with the fuser roller 64 to form a nip through which the substrate 52 passes. In the fusing operation and the station 58, the toner particles coalesce with one another and bond to the substrate to affix a multi-color image onto the upper side thereof.

While the multi-color developed image has been disclosed as being transferred from the photoreceptor belt 4 to the substrate 52, in other possible embodiments, the toner may be transferred to an intermediate member, such as another belt or a drum, and then subsequently transferred and fused to the substrate 52. Moreover, while toner powder images and toner particles have been disclosed herein, one skilled in the art will appreciate that a liquid developer material employing toner particles in a liquid carrier may also be used, and that other forms of marking materials may be employed, wherein all such alternate embodiments are contemplated as falling within the scope of the present disclosure.

For single-side printing, the fused substrate 52 continues on the first path P1 to be discharged to a finishing station (not shown) where the sheets are compiled and formed into sets which may be bound to one another and can then be advanced to a catch tray for subsequent removal therefrom by an operator of the document processing system 2.

For two-sided printing, the system 2 includes a duplex router 82 that selectively diverts the printed substrate medium 52 along a second (e.g., duplex bypass) path P2 to a media inverter 84 in which the substrate 52 is physically inverted such that a second side of the substrate 52 is presented for transfer of marking material in the transfer station 50. Absent one or more countermeasures of the present disclosure, the heat introduced into the substrate 52 by the fusing station 58 may cause the substrate 52 to shrink, and if two-sided printing is performed, the duplex router diversion to the second path P2 and media inversion in the apparatus 84 may return the inverted substrate 52 to the transfer station 50 before the substrate 52 can be again acclimated to the ambient temperature, whereby the image is transferred to the second side of the substrate 52 before the substrate 52 returns to its original size, and process magnification error results.

In order to combat this, the system 2 provides multiple ROS clock sources including a fixed frequency clock source (also referred to as the first clock or clock 1) 101 providing a fixed frequency ROS master clock (RMC) signal 101a to the ROSs 22, 28, 34, 40, and 46, and an NCO-based adjustable frequency clock source (also referred to as the second clock or clock 2) 102 providing an adjustable frequency ROS master clock (RMC) signal (generated by the NCO) 102a to the ROSs. The system 2 further includes a controller 100 coupled with the ROSs 22, 28, 34, 40, and 46, which selectively operates a given ROS according to the fixed frequency clock signal 101a if the latent image being generated by the given ROS is to be fixed to a first side of the substrate 52 or alternatively according to the adjustable frequency clock signal 102a if the latent image being generated by the given ROS is to be fixed to a second side of the substrate 52. The controller 100 may be any suitable form of hardware, software, firmware, programmable logic, or combinations thereof, whether unitary or implemented in distributed fashion in a plurality of components, wherein all such implementations are contemplated as falling within the scope of the present disclosure and the appended claims. The first clock 101 and the second clock 102 may directly couple their output signals 101a and 102a, respectively to the individual ROSs 22, 28, 34, 40, and 46 or local ROS interface modules (RIMs) thereof as shown, or alternatively, the first clock 101 and/or the second clock 102 can be connected indirectly to the ROSs 22, 28, 34, 40, and 46 via one or more intervening components such as the controller 100, or the controller 100 may include one or both of the first clock 101 and the second clock 102, wherein all such variant implementations as contemplated as falling within the scope of the present disclosure.

The second clock 102, moreover, allows for calibration of the frequency signal 102a to counteract the amount of shrinkage-related side 1 to side 2 process magnification error in a given document processing system 2. In particular, the illustrated embodiments provide for a frequency ratio of the first clock 101 and the second clock 102 that corresponds to a side 1 to side 2 process magnification difference for the system 2 as measured during setup using the first clock 101, where the side 1 to side 2 process magnification is quantified as the ratio of the side 1 image size divided by the side 2 image size using the first clock 101 to perform two-sided printing of the same image data size to both sides of a substrate 52.

As stated above, the second clock 102 generates an adjustable RMC signal 102a. The output 102a is used to source a square wave digital clock signal that is, in turn, used as an adjustable ROS master clock (RMC). The frequency of the signal 102a is controlled by the controller 100, which sends a parameter value via control signal(s) 103 to the second clock 102 control inputs, which, in turn, sets the desired NCO output frequency (102a).

Referring also to FIGS. 2 and 3, the exemplary photoreceptor belt 4 includes a plurality of image panel zones (FIG. 2) in which the ROSs 22, 28, 34, 40, and 46 generate latent images, where three exemplary panel zones 106a, 106b, and 106c are illustrated in the partial view of FIG. 2. Any number of panels 106 may be defined along the circuitous length of the photoreceptor 4, and the number may change dynamically based on the size of the printed substrates 52 being fed to the transfer mechanism 50, where the illustrated belt 4 includes about 11 such zones 106 for letter size paper sheet substrates 52. The panel zones 106 are separated from one another by inter panel zones IPZ, where two exemplary inter panel zones IPZ1 and IPZ2 are shown in FIG. 2, with IPZ1 being defined in a portion of the belt 4 that includes a belt seam 4s. In operation, the controller 100 provides the individual ROSs 22, 28, 34, 40, and 46 with one or more control signals via connections 104, including a control parameter associated with each upcoming image panel zone 106 to indicate whether a latent image to be generated on the upcoming panel zone 106 is to be fixed to a first side or to a second side of the substrate 52. Based on this control parameter, the ROSs 22, 28, 34, 40, and 46 individually select one of the ROS master clock output signals 101a, 102a for use in generating a latent image on the upcoming panel zone 106.

As best shown in FIG. 3, further details are schematically illustrated for the first ROS 22, wherein the other ROSs 28, 34, 40, and 46 in the exemplary system 2 are similarly constructed. The ROS system 22 includes a data input 104a from the controller 100 to a driver 112 of a diode laser 114, as well as a clock select parameter input 104a from the controller 100 to a clock select component 105 for selecting between first and NCO inputs 105a and 105b connected to the first clock 101 and to the second clock 102, respectively. The clock select component 105 selectively couples the output of the first clock 101 or the second clock 102 to a selected clock input connection 128b that is operatively coupled to the clock input of a polygon motor speed control 128a.

The second clock 102 synthesizes a discrete-time, discrete-valued representation of a sinusoidal waveform. It is often used in communications systems to generate a phase continuous sin(x), cos(x) signal, a fact that is advantageous to know when receiving the signal from an NCO-based transmitter.

The NCO-based adjustable frequency clock source 102 generally consists of several components, including a phase accumulator 116 and a phase-to-amplitude converter 118. The phase accumulator 116 performs the role of a digital waveform generator by incrementing a phase counter by a per-sample increment. The phase-to-amplitude converter 118 is often, but not always, implemented in the form of a (ROM) read-only memory. 118 may also be implemented using a CORDIC algorithm or techniques utilizing multipliers. In the ROM method for this example, phase values are looked up in a waveform table to create a waveform at any desired phase offset. Although not shown, a digital-to-analog converter (DAC) is needed if an analog output is desired. In that case, the set of waveform sample values that are sequentially extracted from the lookup table during the process is sent to the digital-to-analog converter to produce an analog waveform. The output of the DAC is subsequently filtered by an analog filter (also known in the industry as deglitcher) in order to remove aliasing and DAC artifacts (glitches). Alternatively, a digital waveform may be used directly as an input for further digital signal processing.

Because this application requires a square wave signal and not a sinusoid, there is no need for the DAC or filtering operation described above for this system's use.

Figure 4:
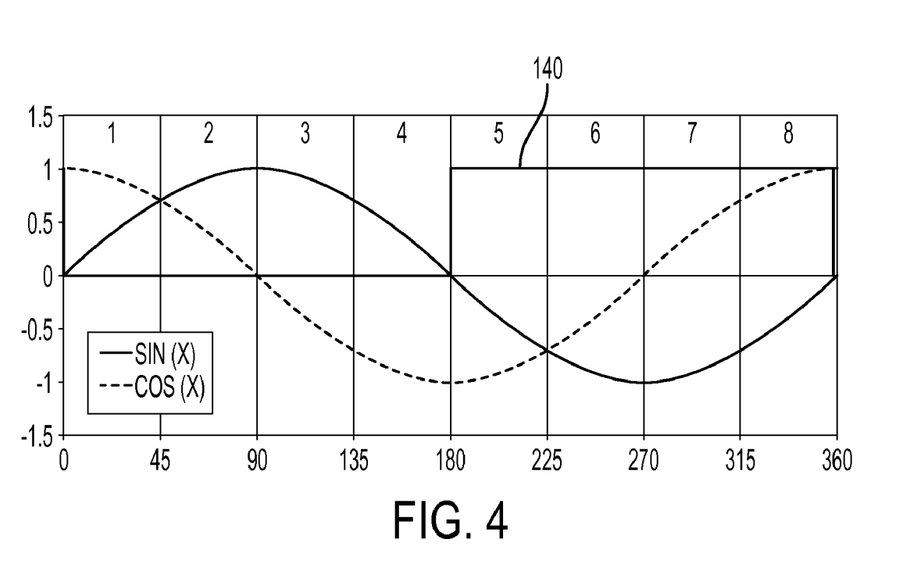
FIG. 4 shows a normalized amplitude sin(x), cos(x) drawing in accordance with aspects of the exemplary embodiments.

Referring now to FIG. 4, a normalized amplitude sin(x), cos(x) graph is shown. The discrete-time, discrete-valued output of the NCO is a sequence of 32 bit, two's compliment, numbers where 0x00000000 corresponds to a value of −1 on the drawing and 0xFFFFFFFF corresponds to a value of +1 on the plot. A first line 140 on the drawing represents the digital value of the MSB of the 32 bit output. It can be seen that the most significant bit (MSB) toggles between binary 0 and binary 1 at the zero crossing points of the sinusoid. Therefore, the MSB of the NCO output represents a digital square wave with a period that matches the sinusoid cycle period. The NCO MSB output signal is used in this system as the MPA clock to control the ROS rotational velocity.

Since the NCO-based adjustable frequency clock source 102 synthesizes a discrete-time, discrete-valued representation of a sinusoidal waveform it is quite readily implemented in digital electronics system, which contains a Field Programmable Gate Array (FPGA), for very low cost. Such is the case for this particular implementation.

The NCO-based adjustable frequency clock source 102 outputs a sinusoidal waveform in two's complement representation. The waveform for the generated sine wave is defined by the following equation:

$$S(nT) = A \sin[2\pi((f_O + f_{FM})nT)] \qquad \text{Eq. 1}$$

where:
T is the sampling clock period;
$f_O$ is the unmodulated output frequency based on the input value $\phi_{INC}$; and
A is $2^{N-1}$ where N is the magnitude precision (and N is an integer in the range 10-32)

The generated output frequency, fo for a given phase increment, $\phi_{inc}$ is determined by the following equation:

$$f_O = \phi_{inc} * (f_{sample\_clock})/2^M \text{ Hertz} \qquad \text{Eq. 2}$$

where:
M is equal to the NCO phase accumulator precision, which is 32 bits in this implementation; and
$f_{sample\ clock}$ is the clock frequency of the circuit embedded counters and state machines.

By way of example, if a 200 MHz sampling clock is used to drive the NCO 102 with an accumulator precision of 32 bits, the frequency resolution of the NCO output is 0.0117 Hz. Therefore, to generate a RMC output frequency to the ROS of 1.415 MHz from this oscillator, the controller 100 would program the NCO $\phi_{INC}$ input value with:

(1415000/200000000)*2³² = 30386894.

During operation of the ROS 22, a stream of image data is provided to the driver 112 associated with a single color portion of a panel image, and the driver 112 modulates a diode laser 114 to produce a modulated light output 122 in conformance with the input image data. The laser beam light output 122 passes into conditioning optics 124 and then illuminates a facet 126 of a rotating polygon 128 having a number of such facets 126 (eight in one example). The light 122 is reflected from the facet 126 through a lens 130 to form a spot on the photosensitive image plane of the passing photoreceptor belt 4. The rotation of the facet 126 causes the spot to sweep across the image plane forming a succession of scan lines oriented in a "fast scan" direction (e.g., generally perpendicular to a "slow scan" or process direction 4p along which the belt 4 travels). Movement of the belt 4 in the slow scan direction 4p is such that successive rotating facets 126 of the polygon 128 form successive scan lines that are offset from each other in the slow scan direction. Each such scan line in this example consists of a row of pixels produced by the modulation of the laser beam 122 as the laser spot scans across the image plane, where the spot is either illuminated or not at various points as the beam scans across the scan line so as to selectively illuminate or refrain from illuminating individual locations on the belt 4 in accordance with the input image data.

In the illustrated example, the ROS system 22 includes the driver 112 and clock select component 105, which together constitute a ROS interface module (RIM) 113 that receives the first and NCO signals from the first clock 101 and the second clock 102, where the controller 100 provides the parameter 104a to the RIM in order to indicate to the RIM whether the upcoming panel image is destined for side 1 or side 2 on the final printed substrate 52. This parameter allows the RIM of a given ROS to determine whether or not to switch clocks, and this selective employment of the faster NCO 102 facilitates adaptation of side 2 images to the preshrunk substrate 52 resulting from the duplex routing and inversion following the high temperature fusing in two-sided printing in the document processing system 2. In this regard, the speed of the ROS motor polygon assembly (MPA) 128, along with the speed of the photoreceptor belt 4 determine the overall process magnification of the latent image on the belt, where the belt speed is held substantially constant in the system 2, and the process magnification error is susceptible to substrate size variation resulting from thermal shrinking in the fuser 58 absent the selective dual speed MPA operation of the present disclosure.

It is noted that since there may be multiple panels 106 having images for different substrate sides at any given time, the speed of the belt 4 cannot be changed to address the side 1 to side 2 process magnification errors caused by substrate shrinkage in the fuser 58. Moreover, there are typically more than one ROS generating latent images concurrently, and thus simply changing the speed of a single ROS clock does not provide a solution, since the concurrently generated latent images may be destined for both side 1 and side 2 of the substrate 52 at any given time.

The presently disclosed techniques employ two separate clocks 101 and 102, with the higher speed NCO-based second clock 102 being used by the ROSs while generating latent images destined for side 2 of the substrate 52. The transition to the second clock 102 in the illustrated embodiment is done during the time when an IPZ is traveling past the ROS, with each ROS being selectively adapted to the appropriate clock 101, 102 independently as the belt 4 continues at a generally constant controlled speed. In the system 2, moreover, the image data synchronization is maintained by providing the fixed frequency RMC signal 101a to the driver 112. Once a ROS has switched to the second clock 102 for driving the MPA 128, the ROS operates to re-phase the MPA 128 when a sync signal is received from the first clock 101.

Figure 5:
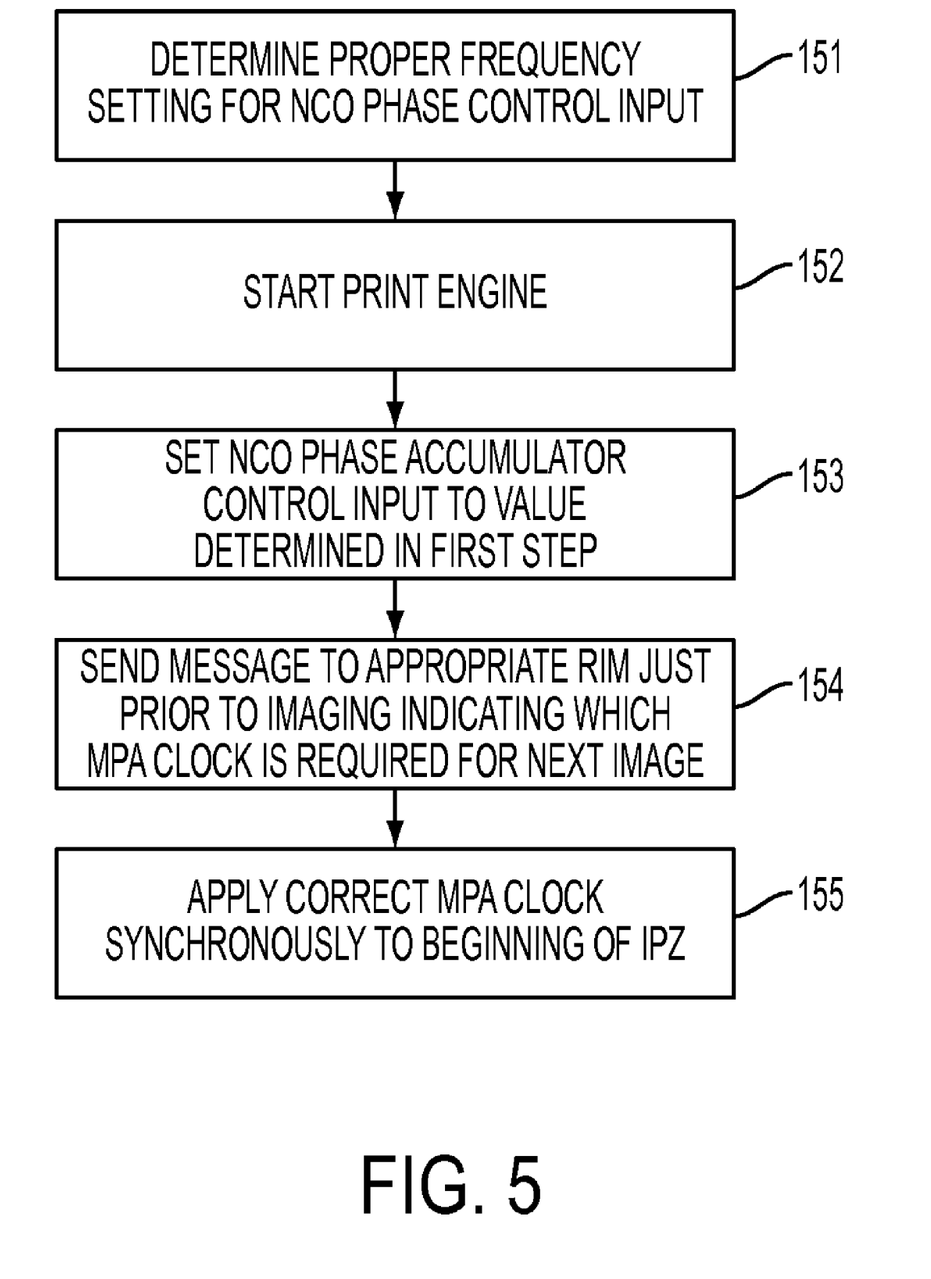
FIG. 5 is a flow diagram illustrating an exemplary duplex printing method in accordance with aspects of the present disclosure

An exemplary method of operation is shown in FIG. 5 and described below.

Initially, the controller 100 will determine a proper frequency setting for the NCO phase increment control input signal 103 to achieve the desired corresponding frequency output that must be applied to the ROS MPA rotational velocity for Side 2 of a duplex printed image (151). The data used to set the NCO phase accumulator control input can be determined from a set of predetermined values stored in the controller's system memory or disk. These would correspond to shrinkage rates of given paper types. The data may also be learned and calculated for a given paper stock by some method not comprehended here.

Next, the controller 100 will start the document processing system (or print engine) 2 (152).

At this point, the controller 100 will set the NCO phase accumulator control input 103 to the value determined in the initial step above (153).

The controller 100 will then send a message to the appropriate ROS control module (RIM), for example RIM 113, in the system 2 just prior to imaging, indicating which MPA clock is required for the next image, i.e., either the NCO-generated MPA clock for a side 2 image or the fixed MPA clock (154).

The RIM 113 will apply the correct MPA clock synchronously to the beginning of the inter image panel zone (e.g., IPZ1) (155).

This process repeats for every image panel until the print job has completed.

An advantage of this implementation is the ability to generate an extremely precise reference clock to control ROS MPA speed, which is also adjustable by controller. Furthermore, implementing this approach with an FPGA is very flexible and highly cost effective. Alternate implementation techniques are possible using Direct Digital Synthesis (DDS) integrated circuits, which are commercially available. This would be a more expensive and less highly integrated system approach but will also solve the technical need of this system implementation.

Figure 6:
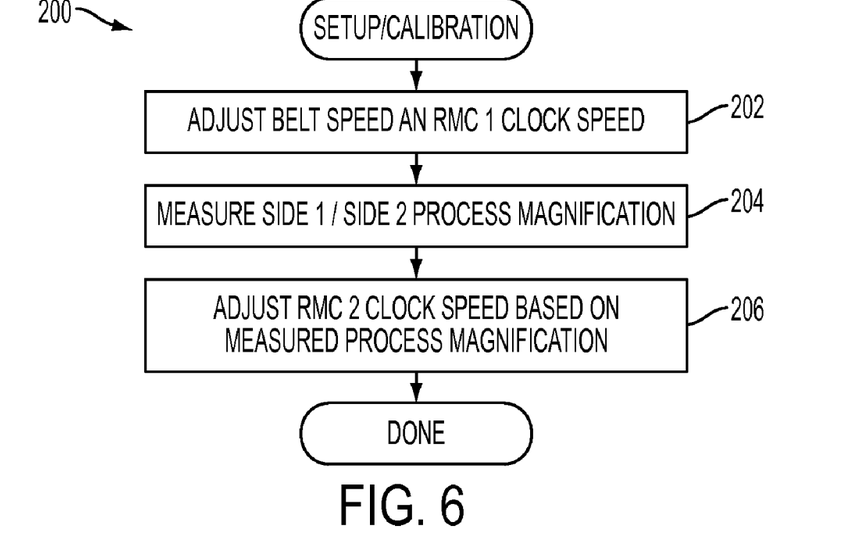
FIG. 6 is a flow diagram illustrating an exemplary setup procedure whereby side 1 to side 2 process magnification is measured and used to adjust the speed of an NCO in accordance with aspects of the present disclosure.
Figure 7:
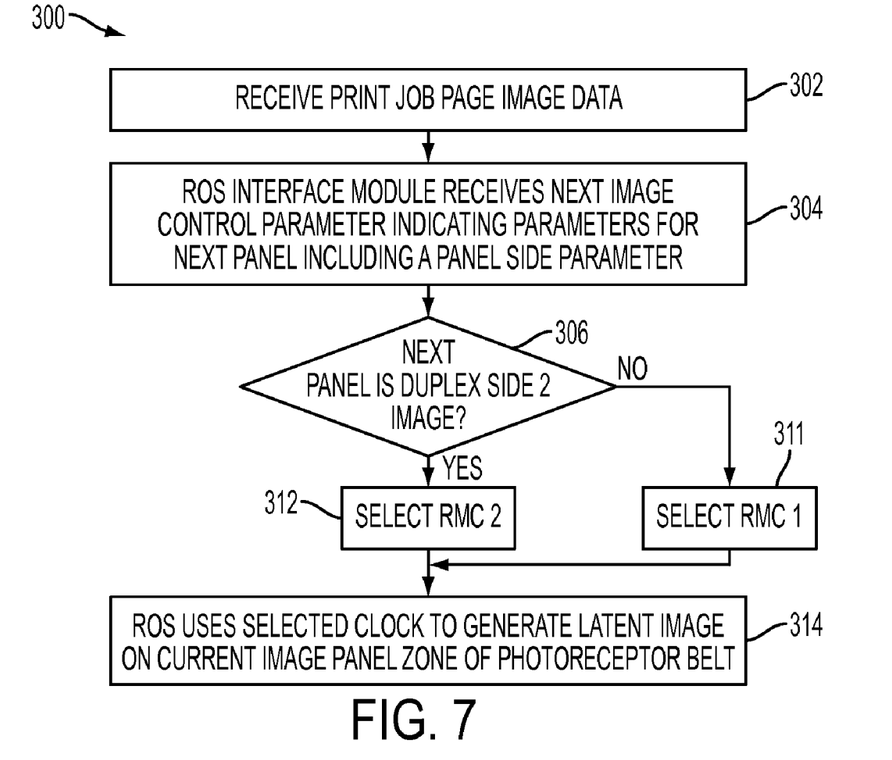
FIG. 7 is a flow diagram illustrating an exemplary duplex printing method in accordance with aspects of the present disclosure.

Referring to FIGS. 6 and 7, the output signal of the NCO 102 is set relative to the frequency of the first clock 101 to counteract a measured process magnification error performed using the first clock 101. FIG. 6 illustrates an exemplary setup procedure 200 in which the speed of the belt 4 and the first clock 101 (or RMC 1) 101 may be adjusted at 202. A side 1 to side 2 process magnification is then measured at 204. The measurement at 204 can be any suitable show-thru error measurement in which images are printed onto two sides of a single substrate, preferably by printing the same image data on both sides, such that the process magnification error attributable to fuser shrinkage of the substrate 52 can be quantified. In one embodiment, the process magnification error is characterized at 204 as the side 1 image size divided by the side 2 image size for images printed using image data representing the same image size, to yield a unitless error ratio. At 206, the second clock 102 (or RMC 2) speed is adjusted based on the measured process magnification. In one implementation, the clock speed of the NCO 102 is adjusted at 206 such that the frequency ratio of the first clock 101 and the second clock 102 corresponds to the side 1 to side 2 process magnification for the system 2 measured using the first clock 101. Thus, for example, a 2% measured process magnification error would yield a side 2 image that is 2% larger than that of side 1, and the second 102 would be adjusted at 206 to be 2% faster than the first clock 101.

FIG. 7 illustrates an exemplary process 300 in which the adjustable second 102 (and the first clock 101) are used in performing duplex printing in the system 2. At 302, print job page image data is received in the system 2, such as in the controller 100. This data can include latent image data for one or more colors (e.g., corresponding to the ROSs 22, 28, 34, 40, and 46 in FIG. 1), where each page data is ultimately destined for printing onto either side 1 or side 2 of the substrate 52. At 304, the controller 100 determines this from the data and sends image control information to each of the ROSs 22, 28, 34, 40, and 46 relating to latent images to be generated in upcoming image panel zones 106 of the photoreceptor belt 4. The individual ROSs receive next image control parameters at 304 that include a panel side parameter indicating whether a latent image to be generated by a given ROS on an upcoming panel zone 106 is to be fixed to a first side or a second side of the substrate 52. The control parameter is preferably provided prior to the end of the IPZ preceding the upcoming panel zone 106, and the method 300 may include allowing the selected clock output signal to settle at 304 prior to generating the latent image in the upcoming image panel zone 106. The RIM of each ROS determines at 306 whether the next image is for the second side, and if not (NO at 306), the first clock 101 (RMC 1) is selected at 311. Otherwise, if the next image is for side 2 (YES at 306), the second clock 102 (RMC 2) is selected at 312. The ROS then uses the selected RMC at 314 to generate the latent image in the current image panel zone 106 of the photoreceptor belt.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A document processing system comprising:
   a photoreceptor that continuously moves along a closed path;
   a plurality of raster output scanners (ROSs) located along the closed path of the photoreceptor, the ROSs individually operable to generate a latent image on a portion of the photoreceptor based on a clock input;
   a fixed frequency clock source providing a fixed frequency output signal to the ROSs;
   a numerically controlled oscillator-based adjustable frequency clock source providing an adjustable frequency output signal to the ROSs; and
   a controller coupled with the ROSs to selectively operate a given ROS according to the fixed frequency output signal if the latent image being generated by the given ROS is to be fixed to a first side of the substrate or according to the adjustable frequency output signal if the latent image being generated by the given ROS is to be fixed to a second side of the substrate, wherein the photoreceptor includes a plurality of image panel zones in which the ROSs generate latent images, with successive panel zones separated by inter panel zones, wherein the controller provides the ROSs with a control parameter indicating whether a latent image to be generated on an upcoming panel zone is to be fixed to a first side or a second side of the substrate, and wherein the ROSs individually select one of the output signals for use in generating a latent image on the upcoming panel zone based on the control parameter.

2. The system of claim 1, wherein the NCO-based adjustable frequency clock source comprises a phase accumulator and a phase-to-amplitude converter.

3. The system of claim 2, wherein the phase accumulator performs the role of a digital waveform generator by incrementing a phase counter by a per-sample increment.

4. The system of claim 3, wherein the phase-to-amplitude converter comprises a (ROM) read-only memory, a CORDIC algorithm or a mechanism utilizing multipliers.

5. The system of claim 1, wherein the NCO-based adjustable frequency clock source is adjusted such that a frequency ratio of the clock sources corresponds to a side 1 to side 2 process magnification for the system measured using the fixed frequency clock source.

6. The system of claim 1, further comprising:
   a plurality of developers individually located downstream of a corresponding one of the ROSs and individually operable to develop toner of a given color on the latent image on the photoreceptor;
   a transfer station operative to transfer the developed toner to the substrate traveling along a first substrate path;
   a fusing station for fixing the transferred toner to the substrate;
   a duplex router receiving the substrate from the fusing station and operative to selectively direct the substrate along a second path;
   a media inverter located along the second path and operative to invert the substrate and to return the inverted substrate to the first path upstream of the transfer station.

7. A raster output scanner (ROS) for generating a latent image on a portion of a photoreceptor traveling along a closed path past the ROS, comprising:
   a light source operative to generate light according to image data;
   a scanning mechanism that directs light from the light source toward a photoreceptor according to a selected clock input;
   a fixed frequency ROS master clock input signal;
   an adjustable frequency ROS master clock input signal; and
   a clock select component that selectively connects one of the input signals to the selected clock input according to a select input, wherein the photoreceptor includes a plurality of image panel zones in which the ROS generate latent image, with successive panel zones separated by inter panel zones, wherein the controller provides the ROSs with a control parameter indicatinq whether a latent image to be generated on an upcoming panel zone is to be fixed to a first side or a second side of the substrate, and wherein the ROSs individually select one of the output signals for use in generating a latent image on the upcoming panel zone based on the control parameter.

8. The ROS of claim 7, wherein the adjustable frequency ROS master clock input signal is generated by a numerically controlled oscillator-based adjustable frequency clock source comprising a phase accumulator and a phase-to-amplitude converter.

9. The ROS of claim 8, wherein the phase accumulator performs the role of a digital waveform generator by incrementing a phase counter by a per-sample increment.

10. The ROS of claim 9, wherein the phase-to-amplitude converter comprises a (ROM) read-only memory, a CORDIC algorithm or a mechanism utilizing multipliers.

11. A duplex printing method comprising:
    receiving image data for print job pages;
    selectively generating latent images on panel zone portions of a photoreceptor that continuously moves along a closed path using a plurality of raster output scanners (ROSs) positioned along the path, the latent image being generated by a given one of the ROSs by selectively operating the given ROS according to a fixed frequency ROS master clock signal if the latent image being generated by the given ROS is to be fixed to a first side of a substrate or according to an adjustable frequency ROS master clock signal if the latent image being generated by the given ROS is to be fixed to a second side of the substrate;
    developing toner of a given color on the latent images on the photoreceptor using a plurality of developers individually located downstream of a corresponding one of the ROSs;
    transferring the developed toner to a substrate traveling along a first substrate path using a transfer station;
    fixing the transferred toner to the substrate using a fusing station;
    for two-sided printing, selectively directing the substrate along a second path using a duplex router; and
    for two-sided printing, selectively inverting the substrate using a media inverter located along the second path and returning the inverted substrate to the first path upstream of the transfer station.

12. The method of claim 11, further comprising:
    generating the fixed frequency ROS master clock signal using a fixed frequency clock source;
    generating the adjustable frequency ROS master clock signal using a numerically controlled oscillator (NCO)-based adjustable frequency clock source comprising a phase accumulator and a phase-to-amplitude converter.

13. The method of claim 12, wherein the phase accumulator performs the role of a digital waveform generator by incrementing a phase counter by a per-sample increment.

14. The method of claim 13, wherein the phase-to-amplitude converter comprises a (ROM) read-only memory, a CORDIC algorithm or a mechanism utilizing multipliers.

15. The method of claim 11, further comprising:
measuring a side 1 to side 2 process magnification using the fixed frequency clock source;
adjusting the NCO-based adjustable frequency clock source based on the measured side 1 to side 2 process magnification.

16. The method of claim 15, wherein the NCO-based adjustable frequency clock source is adjusted such that a frequency ratio of the clock sources corresponds to the measured side 1 to side 2 process magnification.

17. The method of claim 11, wherein the photoreceptor includes a plurality of image panel zones in which the ROSs generate latent images, with successive panel zones separated by inter panel zones, further comprising:
providing a first clock output signal from the first clock to each of the ROSs;
providing a second clock output signal from the second clock to each of the ROSs;
providing the individual ROSs with a control parameter indicating whether a latent image to be generated on an upcoming panel zone is to be fixed to a first side or a second side of the substrate; and
at the individual ROSs, selecting one of the clock output signals for use in generating a latent image on the upcoming panel zone based on the control parameter.

18. In a document processing system having a fixed frequency clock source providing a fixed frequency output signal to a plurality of raster output scanners (ROSs) and a numerically controlled oscillator (NCO)-based adjustable frequency clock source providing an adjustable frequency output signal to the ROSs, a magnification adjustment method comprising:
(a) using a controller to determine a frequency setting for a phase increment control input signal to the NCO-based adjustable frequency clock source;
(b) starting the document processing system;
(c) using the controller to set a phase accumulator control input to the frequency setting determined in step (a) above;
(d) sending a message to a ROS control module (RIM) in the document processing system prior to imaging, wherein the message the correct clock source to use for the next image, the correct clock source being either the fixed frequency clock source or the NCO-based adjustable frequency clock source; and
(e) applying the correct clock source synchronously to the beginning of an inter image panel zone.

19. The method of claim 18, wherein the NCO-based adjustable frequency clock source comprises a phase accumulator and a phase-to-amplitude converter.

20. The method of claim 19, wherein the phase accumulator performs the role of a digital waveform generator by incrementing a phase counter by a per-sample increment.

21. The method of claim 20, wherein the phase-to-amplitude converter comprises a (ROM) read-only memory, a CORDIC algorithm or a mechanism utilizing multipliers.

22. The method of claim 18, wherein the NCO-based adjustable frequency clock source outputs a sinusoidal waveform in two's complement representation and the waveform for the generated sine wave is defined by the following equation:

$$S(nT) = A \sin[2\pi((f_O + f_{FM})nT)]$$

where:
T is a sampling clock period;
$f_O$ is an unmodulated output frequency based on the input value $\phi_{INC}$;
A is $2^{N-1}$ where N is a magnitude precision and N is an integer in the range 10-32.

23. The method of claim 22, wherein the generated output frequency $f_O$ for a given phase increment, $\phi_{inc}$ is determined by the following equation:

$$f_O = \phi_{inc} * (f_{sample\ clock}) / 2^M \text{ Hertz}$$

where:
M is equal to a NCO phase accumulator precision;
$f_{sample\ clock}$ is a clock frequency of a circuit embedded counters and state machine.

* * * * *